Figure 1:
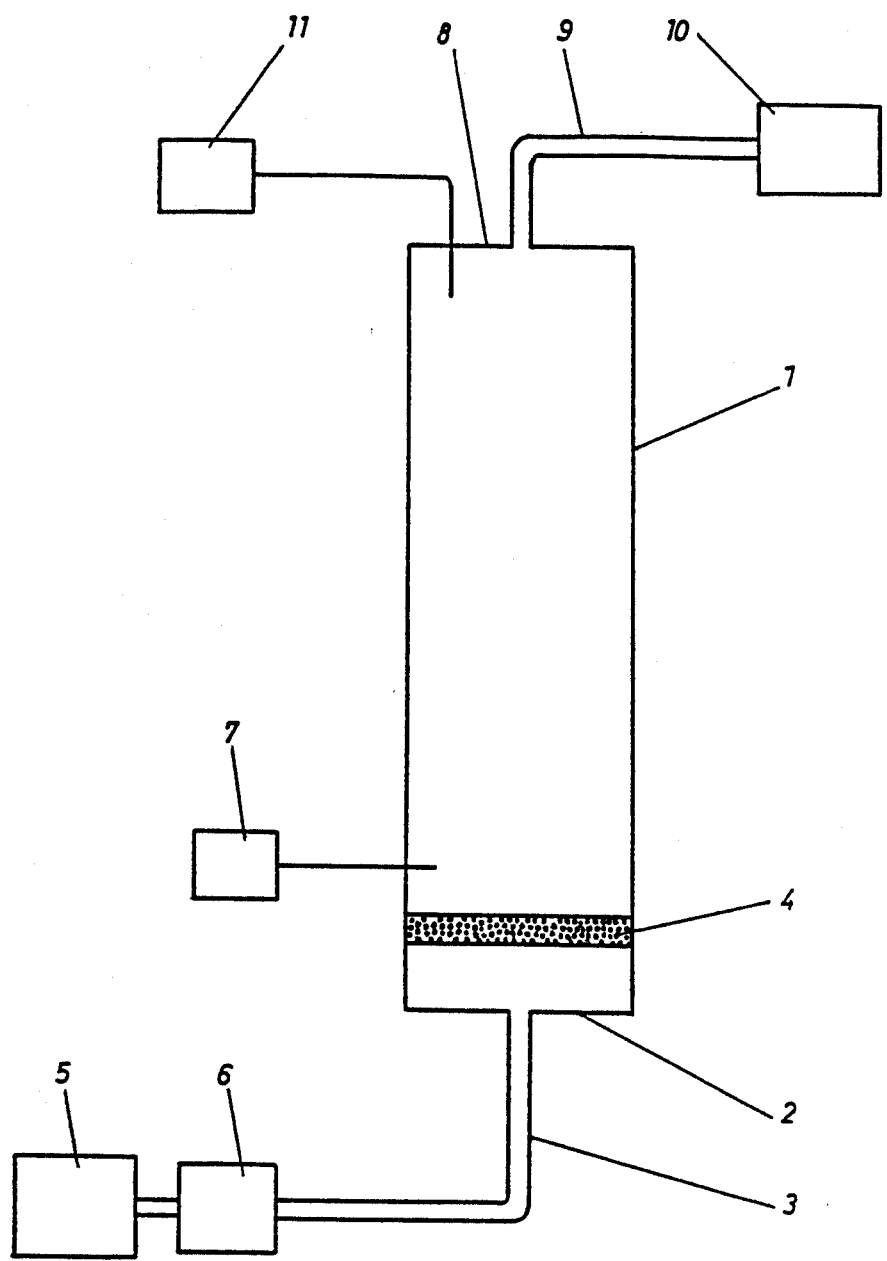

United States Patent [19]

Dingsoyr

[11] Patent Number: 4,935,060
[45] Date of Patent: Jun. 19, 1990

[54] HYDRAULIC CEMENT SLURRY

[75] Inventor: Eldar O. Dingsøyr, Sogne, Norway

[73] Assignee: Elkem a/s, Norway

[21] Appl. No.: 436,978

[22] Filed: Nov. 16, 1989

Related U.S. Application Data

[63] Continuation of Ser. No. 128,085, Dec. 3, 1987, abandoned.

[30] Foreign Application Priority Data

Nov. 16, 1987 [NO] Norway .................................. 874761

[51] Int. Cl.$^5$ .............................................. C04B 14/04
[52] U.S. Cl. .................................... 106/719; 166/292; 166/293; 166/294; 405/266; 106/720; 106/721; 106/803
[58] Field of Search .................. 106/85, 98, 90, 92, 106/93; 405/266; 166/292, 293, 294

[56] References Cited

U.S. PATENT DOCUMENTS

| 4,385,935 | 5/1983 | Skjeldal | 106/98 |
| 4,725,665 | 2/1988 | Pieh et al. | 528/265 |

FOREIGN PATENT DOCUMENTS

| 58-036983 | 3/1983 | Japan | 106/98 |
| 2131409 | 6/1984 | United Kingdom | 106/98 |
| 8000959 | 5/1980 | World Int. Prop. O. | |

*Primary Examiner*—Mark L. Bell
*Assistant Examiner*—Anthony J. Green
*Attorney, Agent, or Firm*—Lucas & Just

[57] ABSTRACT

The cement slurry of the present invention is gas tight, very low strength retrogression at high temperature, and substantially no tendency to settle or segregate. The cement slurry is made with a hydraulic cement, 5-85% microsilica based on the weight of the cement, 5-250% of a high density filler material based on the weight of the cement, 0-5% of a retarder (dry weight) based on the weight of the cement, 0-12% of a thinner (dry weight) based on the weight of the cement, 0-8% of a fluid loss additive (dry weight) based on the weight of the cement, 0-30% silica flour and/or silica sand based on the weight of the cement and water in such an amount that the cement slurry has a density between 1.95 and 2.40 g/cm$^3$.

17 Claims, 1 Drawing Sheet

HYDRAULIC CEMENT SLURRY

This is a continuation of application Ser. No. 128,085, filed Dec. 3, 1987 now abandoned.

The present invention relates to a hydraulic cement slurry composition suitable for use in cementation of oil wells. The most significant features of the invention that the cement slurry is gas tight, has a high density, a low tendency of segregation and very little high temperature cement strength retrogression.

In cementation of oil wells a cement slurry is pumped down into a casing and back up the annular space between the outside of the casing and the wall of the well. The two most important purposes of the cementation process are to prevent transport of gas and liquid between subterranean formations and to tie up and support the casing pipe. In addition to sealing oil, - gas- and waterproducing formations, the cement also protects the casing against corrosion, prevents gas- or oil-blowouts as the cement slurry very fast seals the well, protects the casing against shockloads and seals of formation having lost-circulation.

In order to obtain a successfull cementation, the hydraulic cement slurry has to satisfy a number of specific requirements. The rheology of the cement slurry has to be adjusted in order that the slurry may easily be pumped into the well. Further the cement slurry must effectively displace drilling mud in the annular space between the casing and the well. The cement slurry must have a low fluid loss in order to avoid loss of liquid from the cement slurry into the formation, as loss of liquid will increase the viscosity of the cement slurry. Finally, the cement slurry must have a smallest possible tendency of water separation.

The setting time of the cement slurry must be adjusted to ensure that the cement slurry does not set before the slurry reach the right location when pumped into the well. The setting time which is needed will among other things depend on the depth of cementation and on the temperature in the well.

The density of the cement slurry is of great importance for the cementation process and for the results which are achieved.

For oil wells which are drilled through high pressure formations, cement slurries having a high density are used in order to avoid uncontrolled blow-out. For oil wells which are drilled through low pressure formations where it is not advisable to expose the formations to high hydrostatic pressure, cement slurries having a low density have to be used, as a cement slurry having a too high density and thereby a high hydrostatic pressure may result in breakdown of the formation and loss of the cement slurry into the formation (lost circulation).

Another important property of the cement slurry is early strength. The early strength is critical for how fast the drilling procedure can be restarted after the cementation process is finished.

Cements which have a compressive strength after 24 hours of at least 1.5 MPa are usually satisfactory. The development of the early strength of the cement slurry is very dependent on the temperature in the well.

For cement slurries which are used for cementation of high temperature wells it is further important that the cement slurries do not lose their strength during time. It is known that at temperatures above about 110° C. ordinary Portland cement slurries during time will loose their strength as the normal binding phase, calcium hydroxide, is transformed to alpha-dicalcium silicate. This phenomenon is well known and is called cement strength retrogression.

It is known that cement strength retrogression can be overcome by addition of silicon dioxide materials to the cement slurry. The most frequently used silicon dioxide materials for this purpose are silica flour and silica sand. At high temperature these silicon dioxide materials react with calcium hydroxide to form new binding phases, mainly tobermorite. Tobermorite is a binding phase which is stronger than the normal binding phases which form during hardening of cement slurries. However, addition of silica flour has the disadvantage that the water requirement increases and it becomes difficult to produce a cement slurry having an acceptable low viscosity. On the other hand, by addition of silica sand settling of the sand and the high-density filler material increases at high temperatures.

For some oil wells, the zones adjacent the cement containing annulus, contain gas under substantial pressure. This gas can cause serious problems during cementations of oil wells as the gas may penetrate through the cement slurry whereby an undesireable phenomenon referred to in the art as gas migration may occur.

Gas migration may start during setting of the cement slurry. When the cement sets the cement slurry will change from a hydrostatic fluid to a solid state body. If the cement slurry in this critical phase is not able to resist the gas pressure, channels will be formed in the partial cured cement slurry. Gas under pressure will then flow through the column during the setting of the cement slurry and/or at the boundary between the cement slurry and the wall of the well. This may result in channels which can reach the top of the well.

In order to control or prevent gas migration through cement slurries it has been proposed to add fluid loss control additives or a latex such as styrene/butadiene copolymer to the cement slurries. For normal and low density cement slurries it is further known that addition of microsilica which is a product obtained from off-gases from furnaces for production of silicon of ferrosilicon, strongly improves the gas tightness of cement slurries.

High density cement slurries are produced by adding an inert high density filler material such as for example barite to an ordinary oil well cement slurry on the basis of Portland cement, water and additives for controlling the rheological properties of the cement slurry. The density range for so-called high density oil well cement slurries is from about 2.0 to 2.3 g/cm$^3$.

As set out above, high density cement slurries for oil well cements which are either gas tight or have a low tendency of strength retrogression at high temperatures are known. However, a high density cement slurry which is both gas tight and has a very low tendency of strength retrogression is not known. A further disadvantage of the known high density cement slurries for cementing of oil wells, is that the high density filler material shows a tendency to settle as the temperature increases. The settling of the high density filler material will result in a variable density in the column of cement slurry with a higher density at the bottom of the column and a lower density at the top of the column. This difference in density can give the operators problems in controlling the pressure in the well and may in the worst case cause an uncontrolled blow-out.

It is an object of the present invention to provide a high density hydraulic cement slurry for cementing oil wells wherein the hydraulic cement slurry is gas tight, has a very low strength retrogression at high temperatures and which shows substantially no tendency of settling or segregation.

Accordingly the present invention relates to a high density, gastight hydraulic cement slurry for use in cementation of oil wells, wherein the hydraulic cement slurry comprises hydraulic cement, 5-85% microsilica based on the weight of the cement, 5-250% of a high density filler material based on the weight of cement, 0-5% of a retarder based on the weight of cement, 0-12% of a thinner (dry weight) based on the weight of the cement, 0-8% fluid loss additive (dry weight) based on the weight of cement, 0-45% silica flour and/or silica sand based on the weight of the cement, and water in such an amount that the cement slurry has a density between 1.95 and 2.40 g/cm$^3$.

Any ordinary hydraulic cement can be used, such as for example Portland cement, but preferably cements for oil well cementation specified by API are used.

The microsilica used in the hydraulic cement slurry is preferably amorphous silica dust collected from off-gases from electrothermal smelting furnaces for production of silicon or ferrosilicon containing at least 75% by weight of silicon, but silica dust from furnaces producing 50% ferrosilicon may also be used.

By adjusting the operation parameters, it is also possible to produce amorphous silica dust as the main product from the above mentioned furnaces. Amorphous silica of this kind can also be produced synthetically without reduction and reoxidation. Alternatively a silica generator can be used for producing finely divided silica or silica can be produced by precipitation.

The amorphous silica dust which is used in the hydraulic cement slurry of the present invention consists to a very high extent of submicron, spherical particles.

The silica dust particles may contain 60-100% by weight of $SiO_2$, have a real particle density between 2.00 and 2.40 g/cm$^3$ and a specific area of 15-30 m$^2$/g. The individual particles are mainly spherical and have a diameter below 1 μm. Variation in these values are of course possible. The silica dust may for example have a lower $SiO_2$-content and the particle size distribution may be adjusted by removing course particles.

In order to obtain a most gas tight cement slurry, the hydraulic cement slurry preferably contains 10-60% microsilica based on the weight of cement.

Cement slurries containing 20-50% microsilica based on the weight of the cement are especially preferred.

The hydraulic cement slurry according to the present invention preferably contains 25-110% of the high density filler material. As high density filler material, any conventional high density filler material for high density oil well cement slurries can be used. Such high density filler materials comprise barite, hematite and ilmenite and others.

The hydraulic cement slurry according to the present invention also preferably contains a retarder in the amount of 0.1-3% (dry weight) based on the weight of cement. The chemical composition of retarders are known in the art. They may be based on lignosulfonates, modified lignosulfonates, polyhydroxy carboxylic acids, carbohydrates, cellulose derivatives or borates.

Some of the retarders will also act as thinners in the hydraulic cement slurry and when such retarders are used the dosage of thinners may be reduced.

The hydraulic cement slurry according to the present invention preferably contains a thinner or dispersant in an amount of 0.7 to 6% (dry weight) based on the weight of the cement. Thinners additives which are known as plastisizers or superplastisizers in cement based systems can be used. These are well-known additives which may be based on lignosulfonate, sulfonated napthaleneformaldehyde or sulfonated melamineformaldehyde products.

The hydraulic cement slurry according to the present invention preferably contains 0.1-4% (dry weight) of a fluid loss additive based on the weight of the cement. As fluid loss additive known additives as for example additives based on starch or derivates of starch, derivates of cellulose such as carboxymethylcellulose, metylcellulose or ethylcellulose or synthetic polymers such as polyacrylonitril or polyacrylamide may be used.

Cement slurries which are used at high well temperature preferably contains 10-35% silica flour and/or silica sand based on the weight of the cement.

Both fresh water and sea water may be used in the hydraulic cement slurry of the present invention.

If necessary, accelerators may be incorporated into the cement slurry in order to adjust the setting time.

It has surprisingly been found that the high density hydraulic cement slurry of the present invention is gas tight, shows very little tendency of settling and has a low strength retrogression. Thus the content of high density filler material and the content of silica sand or silica flour can be increased above the conventional levels without effecting the plasticity of the cement slurries while the tendency of settling is strongly reduced.

The present invention will now be further illustrated by the following examples:

EXAMPLE 1

Four cement slurries A, B, C, D were produced. Cement slurries A, B and C have compositions according to the hydraulic cement slurry of the present invention, while cement slurry D has composition according to the state of art.

The compositions of cement slurries A-D are shown in Table I.

TABLE I

| Cement Slurry | A kg | B kg | C kg | D kg |
|---|---|---|---|---|
| G-cement | 100 | 100 | 100 | 100 |
| EMSAC 465T | 10 | 30 | 40 | — |
| Thinner (D-31) | — | 2.4 | 2.4 | — |
| Retarder (R-12) | 2.4 | 2.4 | 2.4 | 3.6 |
| Hematite | — | 103.7 | — | 34.3 |
| Barite | 35.1 | — | 200.5 | — |
| Water | 54.3 | 76.2 | 109.0 | 41.8 |

Theoretical density for slurry A is 2.00 kg/dm$^3$ and for slurries B-D 2,16 kg/dm.

G-cement is a Portland cement delivered by Norcem A/S, Norway.

EMSAC 465T is a high quality microsilica product in dry form which are produced and sold by Elkem a/s, Chemicals, Norway.

D-31 is a thinner and R-12 a retarder, both delivered by B.J. Hughes, USA

Cement slurries A to D were mixed and tested according to API Specification 10. The results are shown in Table II.

TABLE II

| Cement Slurry | A | B | C | D |
|---|---|---|---|---|
| Rheology (20° C.) | | | | |
| Apparent viscosity, cp | 29.5 | 26.5 | 31 | 65.5 |
| Plastic viscosity, cp | 36 | 29 | 28 | 68 |
| Yield point, lb/100 ft$^2$ | (−13) | (−5) | 6 | (−5) |
| Rheology (93° C.) | | | | |
| Apparent viscosity, cp | 20 | 21 | 20 | 34.5 |
| Plastic viscosity, cp | 21 | 23 | 15 | 35 |
| Yield point, lb/100 ft$^2$ | (−2) | (−4) | 10 | (−1) |
| Compressive strength, MPa (After 5 days at 50° C. and 1 day at 93° C.) | 36 | 50.6 | 41.4 | 35 |

From table II it can be seen that slurries A to C according to the present invention, are easy to pump into the well-bore and that they have a good compressive strength compared to the conventional slurry D. Slurries A to C thus fulfill the requirements which are set to the rheological properties for high density oil well cement slurries.

In order to examine the settling of the cement slurries A D the fresh current slurries were heated in an atmospheric consistometer to 93° C. whereafter each cement slurry was poured into a 250 ml graduated cylinder. The cylinders containing the cement slurries were put into water having a temperature of 93° C. and the cement slurries were allowed to cure at this temperature for 24 hours.

Thereafter the cylinders were removed from the water and test specimens with a height of 3 cm were cut from the top and the bottom of each cylinder and the density of the test specimens were measured. The results are shown in Table III.

TABLE III

| Cement slurry | A | B | C | D |
|---|---|---|---|---|
| Density, top, kg/dm$^3$ | 2.04 | 2.15 | 2.16 | 2.09 |
| Density, bottom, kg/dm | 2.04 | 2.19 | 2.14 | 2.41 |

Table III shows that practically no settling or segregation occurred in the cement slurries A–C. In contrast the conventional cement slurry D showed a very significant settling. The very low tendency of settling for the cement slurries according to the present invention is very surprising as the viscosity of especially slurries A and B is much lower than for the conventional slurry D and the content of high density material is much higher for cement slurry A to C than for the conventional slurry D.

EXAMPLE II

Eight cement slurries E, F, G, H, I, J, K, L were produced. Cement slurries E to J have compositions according to the present invention while cement slurries K and L have compositions according to the state of art.

The compositions of cement slurries E-L are shown in Table IV.

TABLE IV

| Cement slurry | E kg | F kg | G kg | H kg | I kg | J kg | K kg | L kg |
|---|---|---|---|---|---|---|---|---|
| G-cement | 100 | 100 | 100 | 100 | 100 | 100 | 100 | 100 |
| EMSAC 460 S | 60 | — | — | — | — | — | — | — |
| EMSAC 465 T | — | 30 | 20 | 50 | 70 | 15 | — | — |
| Silica flour | — | — | — | — | — | 30 | 35 | — |
| Thinner (D-31) | 4.2 | 4.2 | — | 4.8 | 9.6 | 4.2 | 7.2 | — |
| Retarder (R-12) | 0.96 | 0.96 | 0.96 | — | — | 0.96 | — | — |
| Fluid loss additive (D-19) | 0.7 | 0.7 | — | — | — | — | 0.5 | 0.5 |
| Hematite | 104.9 | 104 | — | — | — | — | — | — |
| Barite | — | — | 81.1 | 98.5 | 110.3 | 98.1 | 71.4 | 20.6 |
| Water | 47.6 | 75.7 | 75.0 | 83.2 | 87.3 | 86.7 | 71.9 | 43.8 |

The theoretical density of slurry E and F is 2.16 g/cm$^3$ and the theoretical density of slurry G-L is 2.04 g/cm.

EMSAC 460 S is a high quality microsilica product in the form of an liquid suspension which are produced and sold by Elkem a/s, Chemicals, Norway.

Cement slurries E-L were mixed and tested according to API specification 10. The results are shown in Table V

TABLE V

| Cement slurry | E | F | G | H | I | J | K | L |
|---|---|---|---|---|---|---|---|---|
| Rheology (20° C.) | | | | | | | | |
| Plastic viscosity, cp | 44 | 57 | 29 | 33 | 34 | 40 | 53 | 27 |
| Yield point, lb/100 ft$^2$ | 16 | >4 | 18 | 14 | 12 | 9 | 29 | 5 |
| Rheology (93° C.) | | | | | | | | |
| Plastic viscosity, cp | 36 | 30 | 25 | 27 | 29 | 35 | 48 | 25 |
| Yield point, lb/100 ft$^2$ | 1 | (−4) | 8 | 6 | 4 | 6 | 22 | 3 |

In order to examining the tendency of strength retrogression the compressive strength of test specimens of cement slurries E-L were measured after 7, 14, 21 and 28 days. The test specimens were stored at a temperature of 140° C.

The results are shown in Table VI.

TABLE VI

| Cement slurry | Compressive strength, MPa | | | | | | | |
|---|---|---|---|---|---|---|---|---|
| | E | F | G | H | I | J | K | L |
| 7 days | 47.6 | 41.4 | 38.2 | 48.1 | 48.0 | 46.5 | 40.2 | 33.7 |
| 14 days | 48.0 | 43.0 | 39.5 | 52.4 | 55.2 | 46.2 | 38.7 | 31.1 |
| 21 days | 46.7 | 47.3 | 38.0 | 53.0 | 53.0 | 48.7 | 39.8 | 27.5 |
| 28 days | 47.2 | 46.8 | 37.0 | 52.1 | 52.3 | 45.3 | 38.3 | 21.7 |

From Table VI it can be seen that the cement slurries E-J according to the present invention showed no tendency of strength retrogression. The conventional cement slurry L shows a very significant strength retrogression, and this cement slurry can not be used for cementing oil wells having a high temperature. Cement slurry K shows a low tendency of strength retrogression due to the content of silica flour. However, this cement slurry suffer from a very high tendency of settling in spite of the high viscosity shown in Table V and will cause problems for this reason.

EXAMPLE 3

Cement slurries E and L of Example 2 were tested in a gas migration apparatus. The test was run in the apparatus shown at FIG. 1. The apparatus comprises an acrylic pipe 1. The pipe is 2.0 m high and has an inner diameter of 80 mm and a wall thickness of 5 mm. In the bottom of the pipe 1 a bottom plate 2 is secured. In the bottom plate 2 it is inserted a pipe 3 for supply of air. Just above the bottom plate 2 there is placed a permeable sand filter 4 made from a mix of sand of uniform particle size and epoxy. Air is supplied to the bottom of the pipe 1 by a compressor 5 and the air pressure is controlled by a regulator 6. A transducer 7 for measuring the hydrostatic pressure is inserted into the pipe 1. A cover plate 8 is secured to the top of the pipe 1. The cover plate 8 has an opening for insertion of a pipe 9 which is connected to a gas flowmeter unit 10. To the pipe 1 there is also connected a temperature measuring device 11.

The cement slurries were filled into the pipe 1 and the gas pressure was fixed on 0.25 bar which corresponds to 125% of the water gradient.

If no gas flows through the cement slurries at this gas pressure during the setting of the cement slurries, the cement slurries will be gas tight at all practical gas pressures in oil well formations.

When the cement slurries E and L were tested in the gas migration apparatus as described above, cement slurry E according to the present invention withstood the applied gas pressure, while a substantial flow of gas was measured through the column of the conventional cement slurry L.

What is claimed:

1. An oil- and gas-well hydraulic cement slurry consisting essentially of
   a hydraulic cement,
   5-85% microsilica based on the weight of cement;
   5-250% of a high density filler material based on the weight of the cement, said high density filler material selected from the group consisting of barite, hematite and ilmenite,
   0-5% of a retarder (dry weight) based on the weight of the cement,
   0-12% of a thinner (dry weight) based on the weight of the cement,
   0-8% of a fluid loss additive (dry weight) based on the weight of the cement,
   0-30% of a silica material based on the weight of cement, said silica material selected from the group consisting of silica flour and silica sand, and
   water in such an amount that the cement slurry has a density between 1.95 and 2.40 g/cm$^3$.

2. The hydraulic cement slurry according to claim 1 wherein the amount of microsilica in the cement slurry is 20-50% based on the weight of the cement.

3. The hydraulic cement slurry according to claim 1 wherein the amount of high density filler material in the cement slurry is 25-110% based on the weight of cement.

4. The hydraulic cement slurry according to claim 1 wherein the amount of retarder (dry weight) in the cement slurry is 0.1-3% based on the weight of cement.

5. The hydraulic cement slurry according to claim 1 wherein the amount of thinner (dry weight) in the cement slurry is 0.1-6% based on the weight of cement, said thinner being selected from the group consisting of lignosulfonate, sulfonated naphthalene formaldehyde and sulfonated melamine formaldehyde products.

6. The hydraulic cement slurry according to claim 1 wherein the amount of fluid loss additive (dry weight) in the cement slurry is 0.1-4% based on the weight of the cement, said fluid loss additive selected from the group consisting of starch, starch derivatives, cellulose derivatives and synthetic polymers.

7. The hydraulic cement slurry according to claim 1 wherein the amount of silica material in the cement slurry is 10-35% based on the weight of the cement.

8. The hydraulic cement slurry according to claim 1 wherein the microsilica in the cement slurry is an amorphous silica dust collected from off-gases from electrothermal smelting furnaces used for the production of silicon and ferrosilicon.

9. The hydraulic cement slurry according to claim 8 wherein the amount of the amorphous silica dust in the cement slurry is 10-60% based on the weight of cement.

10. The hydraulic cement slurry according to claim 8 wherein the amorphous silica dust is 60-100% by weight of silicon dioxide, has particles with a real particle density between 2.00 and 2.40 g/cm$^3$ and a specific area of 15-30 m$^2$/g.

11. An oil- and gas-well hydraulic cement slurry consisting essentially of:
    a hydraulic cement;
    5-85% of a microsilica based on the weight of the cement;
    5-250% of a high density filler material based on the weight of the cement, said high density filler material selected from the group consisting of barite, hematite and ilmenite;
    0.1-3% of a retarder (dry weight) based on the weight of the cement;
    0.1-6% of a thinner (dry weight) based on the weight of the cement;
    0.1-4% of a fluid loss additive (dry weight) based on the weight of the cement;
    10-35% of a silica material based on the weight of cement, said silica material selected from the group consisting of silica flour and silica sand; and
    water in such an amount that the cement slurry has a density between 1.95 and 2.40 g/cm$^3$.

12. The hydraulic cement slurry according to claim 11 wherein the amount of microsilica in the cement slurry is 20-50% based on the weight of the cement.

13. The hydraulic cement slurry according to claim 11 wherein the amount of high density filler material in the cement slurry is 25-110% based on the weight of cement.

14. The hydraulic cement slurry according to claim 11 wherein said thinner is selected from the group consisting of lignosulfonate, sulfonated naphthalene formaldehyde and sulfonated melamine formaldehyde products.

15. The hydraulic cement slurry according to claim 11 wherein the fluid loss additive is selected from the group consisting of starch, starch derivatives, cellulose derivatives and synthetic polymers.

16. The hydraulic cement slurry according to claim 11 wherein the microsilica in the cement slurry is an amorphous silica dust collected from off-gases from electrothermal smelting furnaces used for the production of silicon and ferrosilicon.

17. The hydraulic cement slurry according to claim 16 wherein the amount of the amorphous silica dust in the cement slurry is 10-60% based on the weight of cement.

* * * * *